July 27, 1954　　A. OLDEN　　2,684,549
SCALLOP DRAG

Filed May 14, 1951　　2 Sheets-Sheet 1

INVENTOR
*ANDREW OLDEN*

BY
ATTORNEYS

July 27, 1954     A. OLDEN     2,684,549
SCALLOP DRAG
Filed May 14, 1951     2 Sheets-Sheet 2
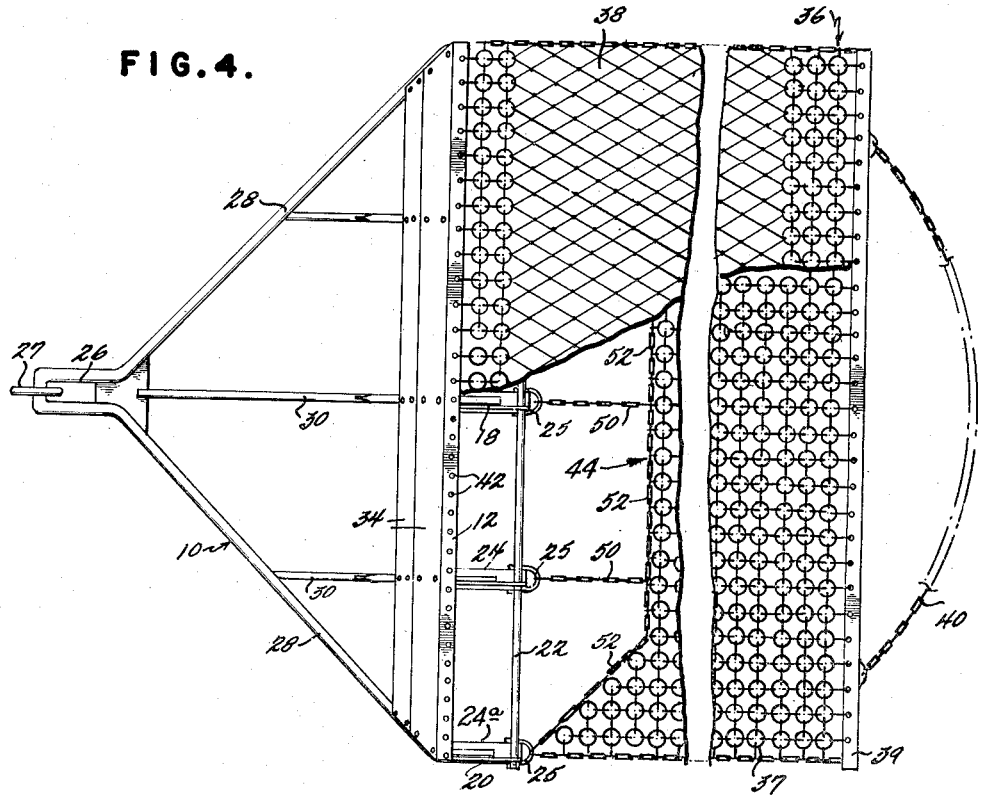
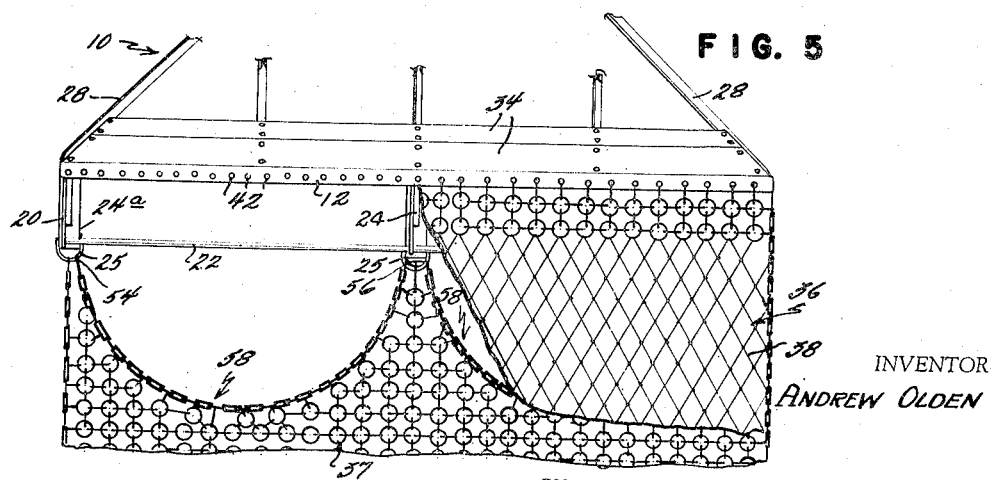
INVENTOR
ANDREW OLDEN
BY
ATTORNEYS Patented July 27, 1954

2,684,549

UNITED STATES PATENT OFFICE 2,684,549

SCALLOP DRAG

Andrew Olden, New Bedford, Mass.

Application May 14, 1951, Serial No. 226,237

6 Claims. (Cl. 43—9)

This invention relates generally to dredges and more particularly to a drag for scallops and other shell fish.

Drags of this general type are well known in the art and have been used for years with relatively few changes therein. Although they have been generally satisfactory, these drags have been relatively inefficient in use in that structural limitations prevent their harvesting all the scallops within their path while being towed along a sea or river bottom by a boat. For example, the nets of prior art structures are attached directly to a rigid drag bar and are thus prevented from closely following the contour of the ocean bottom to scoop up all of the scallops.

Accordingly, the chief object of the present invention is to provide an improved drag for scallops and other shell fish which will be efficient in use so as to harvest a maximum crop from any kind of river or sea bottom.

Another important object of the invention is to provide an improved drag for scallops in which the net is free to closely follow sea bottom contours extending either longitudinally or transversely of the direction of tow or both.

A further important object is to provide an improved drag having means to stir up the scallops so as to increase the harvest scooped into the net.

A still further important object is to provide an improved scallop drag which includes means for preventing large stones from being scooped up in the net.

Another object is to provide an improved drag for scallops, which will be strong, rugged and of long life in use, and easily and economically manufactured.

Other objects and advantages of the invention will become apparent during the course of the following description.

In its broadest aspects, the invention contemplates an improved drag for scallops and other shell fish in which the net is arranged so as to closely follow the sea bottom and exclude large stones while other means are provided for stirring up the scallops lying on the bottom so as to increase the harvest.

In the drawings, I have shown two embodiments of the invention. In these showings:

Figure 4 is a top plan view of a modified form of the invention; and

Figure 5 is a fragmentary plan view of still another embodiment of this invention.

Figure 1:
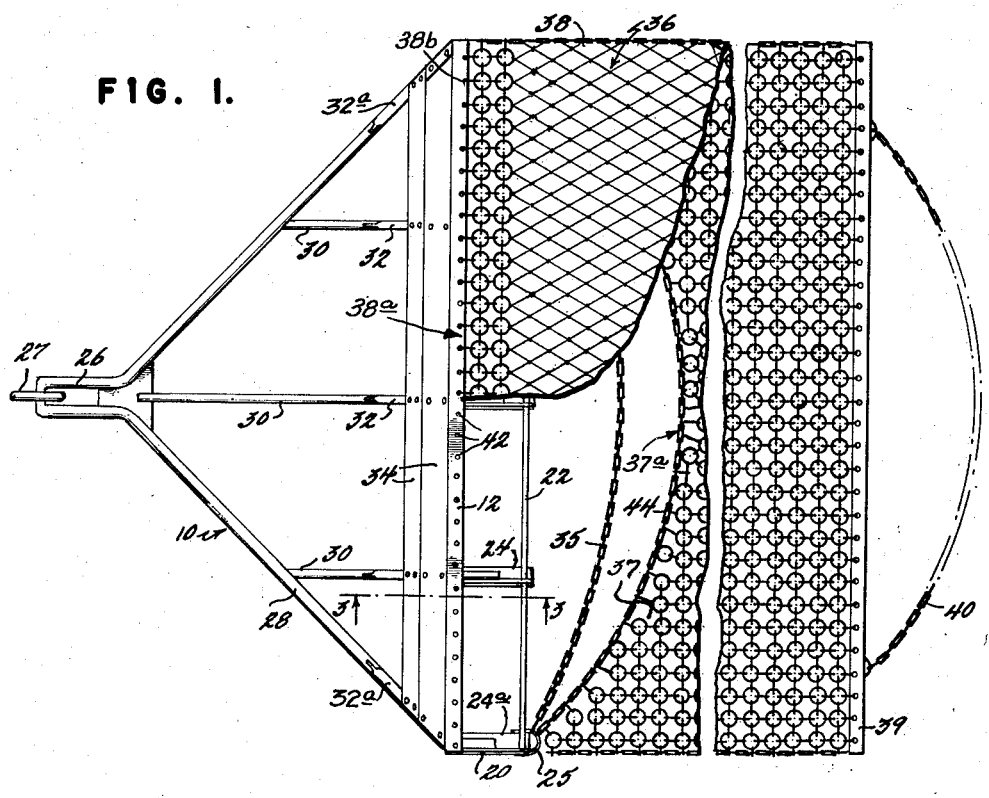
Figure 1 is a top plan view of the improved drag comprising the present invention.

Referring to the drawings, numeral 10 generally indicates the drag as a whole which includes a frame having a top bar or cross member 12 above and spaced from a bottom bar or cross member 14, and connecting end bars 16 all formed from a length of flat bar stock. The bar 12 is rigidly connected to and supported by a plurality of transversely spaced L-shaped plate structures 18, fixed to and resting on the bottom bar 14, and end or outer supports 20 being triangular plates having a plurality of spaced apertures 21 for a reason which will become apparent.

The rear ends of the plates 18 and 20 are connected by a rod 22 to thus complete a strong and rigid frame structure which may be supported on a river or sea bottom by a plurality of spaced shoes 24 and 24a which elevate the frame 3 to 4 inches above the bottom. The shoes 24 and 24a are sled shaped in front to avoid unnecessary drag and are suitably secured to the frame by welding or bolts. Each end shoe 24a includes a chain ring 25 also detachably secured thereto.

The drag 10 is towed along a sea bottom by means of a bail 26 having a tow wire connecting ring 27 at its loop, the legs 28 of the bail curving downwardly and rearwardly therefrom and being fixed to the ends of the lower bar 14. A plurality of brace bars 30 extend forwardly from the bar 14 adjacent the plates 18 and have a rigid connection with the legs 28 to further brace the drag frame at spaced points against the load of the drag net when applied at those points.

A plurality of forwardly and downwardly inclined bars 32 and 32a connect the legs 28 and braces 30 with the upper bar 12 and act as an inclined support for one or more suction plates 34 which extend the width of the frame. These plates form an important feature of the present invention and have an important function in addition to that of assisting in holding the drag against the sea bottom. It will be noted that the plates 34 are positioned in advance of and between the upper and lower frame bars 12 and 14 respectively. The water passing over the inclined plates creates a suction rearwardly thereof so that scallops lying on the bottom are stirred up and pass into the net through an entrance 13 defined by the bars 12 and 14. Further agitation of the bottom may be accomplished by a tickler chain 35 connected to the chain ring 25 and extending across the drag in front of the net in the manner illustrated in Figure 1. Tickler chain 35 also assists in keeping large rocks out of the net.

The net indicated as a whole as 36 comprises a lower section 37 of iron rings or links and an upper section 38 of heavy cord, such as sash cord, formed into meshes. The net sections are both suitably connected at their rear ends to a heavy club 39 to which a net dumping chain 40 is also connected. The forward end of the upper net section 38 preferably terminates in connecting rings 38b which are received in a plurality of spaced apertures 42 formed in the upper frame bar 12. The trailing edge of the net is indicated at 37a and the leading edge at 38a. See Figure 2.

Figure 2:
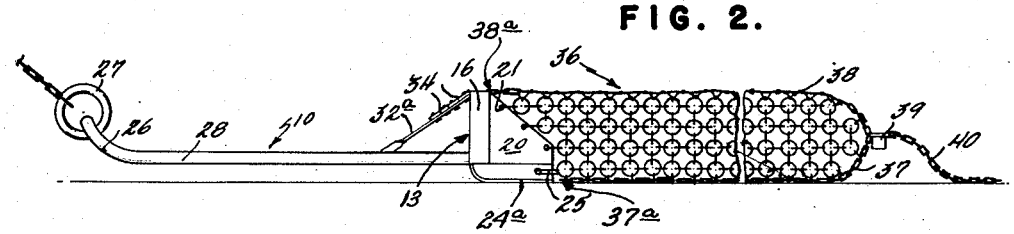
Figure 2 is a side elevational view thereof.
Figure 3:
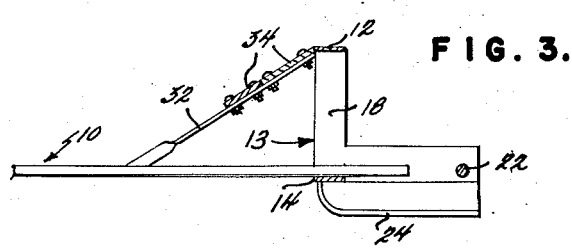
Figure 3 is a vertical sectional view thereof taken on the line 3—3 of Figure 1.

Another important feature of the invention resides in the connection of the lower net section 37 to the drag frame. The forward end of the net section 37 terminates in a sweep chain 44 which is secured to the rear of the drag frame at two spaced points by the rings 25 in the end shoes instead of directly to the rod 22 throughout its length (Figures 1–3 inclusive). The sides of the net are closed by connecting rings or links to the apertures 21 in the triangular end plates 20.

It will now be readily apparent that the sweep chain 44, not being directly connected throughout its length to the rod 22, may readily follow the contour of the seat bottom to scoop more scallops therefrom than was formerly possible when so connected to the rod 22. Thus, on smooth bottoms, an increased yield or harvest of scallops may be had with less rocks or trash due to the inclined suction plate 34 and on rough bottoms, the rearward spacing of the sweepchain 44 from the frame rod 22 along most of its length allows more complete harvest.

The modification disclosed in Figure 4 is particularly suited for use on stony sea bottoms, especially, where the stones are large, and is identical in all respects to Figures 1–3 of the drawings except that stringer chains 50 and two suction plates 34 are used. The stringer chains may be spaced as desired and connect spaced points of the sweep chain 44 with the adjacent rings 25 of the end shoes 24a. As seen in Figure 4, the sweep chain 44 has been divided into four sweep sections 52 which function as above described and the stringer chains act to keep rocks out of the net.

In a further modification, illustrated in Figure 5, the stringer chains 50 are replaced by the sweep chain 50a connected directly to the towing frame at a few spaced points 54 and 56 intermediate the end plates 20 to form a series of arcuate sections 58 along the trailing edge of the lower section 37 of the net. It will be appreciated that the arcuate sections, 58 thus formed are of appreciable depth to give the flexibility required for the sections to follow the sea bottom closely.

The use of the improved scallop drag is believed to be readily apparent. When towed along the sea bottom by a fishing boat, it will efficiently scoop up the shellfish due to the suction created by the inclined plates and the ability of the lower net to follow the bottom contours. If the bottom is rocky, stringer chains may be added to reduce the length of the sweep chain sections and prevent the entrance of the rocks. When the net is full, it is lifted to the boat deck by means of the connecting ring 27 and readily emptied by means of dump chain 40.

It is to be understood that the forms of my invention herewith shown and described are to be taken as preferred examples of the same and that various changes in the shape, size and arrangement of parts may be resorted to without departure from the spirit of the invention or the scope of the subjoined claims.

I claim:

1. A drag for scooping scallops and other shell fish from sea bottoms comprising a frame including a pair of connected, superposed and laterally extending cross-members spaced apart in a vertical plane to form an entrance channel for the shell fish, a rigid braced bail extending forwardly from said frame, said bail having inclined brace means fixedly joining the upper of said frame cross members and the bail, a net extending rearwardly of said frame entrance channel and having trailing edge and leading edge portions, said trailing edge portion being connected to but spaced from the lower of said cross members to enable the net to conform with the contour of the sea bottom, the leading edge portion of said net being connected to the upper of said cross members to form a bag and at least one inclined suction plate positioned intermediately and forwardly of said cross members upon said brace means to create turbulences for agitating the sea bottom.

2. A drag according to claim 1 wherein the trailing edge portion of the net comprises a chain having a linkage substantially heavier than the mesh of the drag net and a tickler chain connected to the rear of said frame arranged to lie substantially immediately ahead of the trailing edge portion of the net to agitate the sea bottom.

3. A drag for scooping scallops and other shell fish from sea bottoms comprising a frame including a pair of connected, superposed and laterally extending cross members spaced apart in a vertical plane to form an entrance channel for the shell fish and a frame rod extending transversely of the frame and fixedly secured to the frame rearwardly of the lower of said cross members, a rigid braced bail extending forwardly from said frame, said bail having inclined brace means fixedly joining the upper of said frame cross members and the bail, a net extending rearwardly of the frame entrance channel and having trailing edge and leading edge portions, the trailing edge portion of one of its ends being connected to but spaced from the lower of said cross members and said rod to enable it to conform to the contour of the sea bottom, the edge leading portion of said net being connected to the upper of said cross members to form a bag, and stringer chains connecting said trailing edge portion and said rod at spaced points intermediate of the rod.

4. A device of the character described in claim 3 further comprising at least one inclined suction plate positioned intermediate and forwardly of said bars upon said brace means to create turbulences for agitating the sea bottom.

5. A drag for recovering scallops and other shell fish from sea bottoms comprising a reinforced frame including a pair of connected, superposed and laterally extending cross members spaced apart in a vertical plane to form an entrance channel for the shell fish, a bail extending forwardly of said frame, a net extending rearwardly of said frame, said net having trailing edge and leading edge portions, bracing for the frame extending from the upper cross member angularly to the bail member and fixedly secured in said bail member, at least two plate supports joined to and trailing the laterally extending cross member to reinforce the frame, a frame rod extending transversely of the frame and fixedly secured to each said trailing plate, a plurality of shoes attached beneath the lower of said cross members and rearwardly about the transverse frame rod, connecting means attached to said shoes the trailing edge portion of said net being attached to said connecting means and spaced from said transverse rod sufficiently to permit conformation with the contour of the sea bottom, the leading edge of said net being connected to the upper of said cross members to form a bag, a chain secured to and along said trailing edge of said net to guard the trailing edge from striking obstacles, and inclined plate means mounted on said bracing of said frame for creating turbulences behind the inclined plate and at the front of the net against the sea bottom to agitate the same.

6. A drag for recovering scallops and other shell fish from sea bottoms comprising a frame including a pair of connected and laterally extending cross members spaced apart in a vertical plane to form an entrance channel for the shell fish, at least two plate supports joined to and trailing the laterally extending cross members to re-inforce the frame, a frame rod extending transversely of the frame and fixedly secured to each said trailing plate, a bail extending forwardly from the frame, inclined brace means joining one of said cross members and said bail, a net extending rearwardly of said frame having leading edge and trailing edge portions, the leading edge portion of said net being secured to the upper of said cross members substantially entirely along the width of said drag, the trailing edge portion of said net including at least two sweep chain sections connected to the frame adjacent the frame rod to enable the leading edge to conform to the contour of the sea bottom, and means mounted on said frame for agitating the sea bottom comprising an inclined plate positioned intermediately and forwardly of said cross members and upon said brace means.

References Cited in the file of this patent

UNITED STATES PATENTS

| Number | Name | Date |
|---|---|---|
| 297,079 | Homan | Apr. 15, 1884 |
| 379,422 | Smith | Mar. 13, 1888 |
| 1,600,839 | Mudge | Sept. 21, 1926 |

FOREIGN PATENTS

| Number | Country | Date |
|---|---|---|
| 11,457 | Great Britain | July 17, 1889 |
| 299,779 | Italy | Aug. 16, 1932 |
| 680,699 | France | May 5, 1930 |